US011331642B2

(12) United States Patent
Jones et al.

(10) Patent No.: US 11,331,642 B2
(45) Date of Patent: May 17, 2022

(54) APPARATUS AND METHOD FOR THE PRODUCTION OF SOLID DOSAGE FORMS

(71) Applicant: Innopharma Research Limited, Dublin (IE)

(72) Inventors: Ian Jones, Redcross (IE); Sean Costello, The Ward (IE)

(73) Assignee: Innopharma Research Limited, Dublin (IE)

( * ) Notice: Subject to any disclaimer, the term of this patent is extended or adjusted under 35 U.S.C. 154(b) by 0 days.

(21) Appl. No.: 16/507,467

(22) Filed: Jul. 10, 2019

(65) Prior Publication Data

US 2020/0016566 A1    Jan. 16, 2020

(30) Foreign Application Priority Data

Jul. 10, 2018 (GB) ..................... 1811303

(51) Int. Cl.
*B01J 19/00* (2006.01)
*G05B 13/04* (2006.01)
(Continued)

(52) U.S. Cl.
CPC ............. *B01J 19/0033* (2013.01); *A61J 3/02* (2013.01); *B01J 2/16* (2013.01); *B01J 8/082* (2013.01);
(Continued)

(58) Field of Classification Search
CPC ....... A61J 3/02; G01N 21/85; G01N 15/0205; G01N 21/3554; G01N 15/0227;
(Continued)

(56) References Cited

U.S. PATENT DOCUMENTS 5,459,318 A * 10/1995 Cacho ................. F26B 25/22
250/339.1
5,522,512 A * 6/1996 Archer ................. B65B 57/14
209/580
(Continued)

OTHER PUBLICATIONS

N. O'Mahony, "Machine learning algorithms for process analytical technology," 2016 World Congress on Industrial Control Systems Security (WCICSS), London, 2016, pp. 1-7, doi: 10.1109/WCICSS. 2016.7882607. Retrieved <https://www.researchgate.net/publication/ 314745757_Machine_Learning_Algorithms_for> (Year: 2016).*

(Continued)

*Primary Examiner* — Thomas C Lee
*Assistant Examiner* — Ameir Myers
(74) *Attorney, Agent, or Firm* — Michael Crilly, Esquire

(57) ABSTRACT

An apparatus for the production of solid dosage forms is presented, wherein the apparatus comprises a material processing chamber which is operable for manufacturing a product according to a pre-set product formation process path. The apparatus has at least one sensor for continuously monitoring formation of the product in the material processing chamber during the product formation process non-invasively in real time by sensing at least one product functional attribute value and a means for comparing each sensed product functional attribute value with a desirable product functional attribute value for that point on the product formation process path. A controller controls operation of the material processing chamber in response to the sensed product functional attribute value for maintaining the product on the product formation process path.

10 Claims, 4 Drawing Sheets

(51) Int. Cl.
*G01N 15/02* (2006.01)
*G01N 21/3554* (2014.01)
*G01N 21/85* (2006.01)
*B01J 2/16* (2006.01)
*B01J 8/08* (2006.01)
*B01J 8/24* (2006.01)
*A61J 3/02* (2006.01)
*G05B 13/02* (2006.01)
*G01N 21/17* (2006.01)
*G01N 21/84* (2006.01)

(52) U.S. Cl.
CPC ............ *B01J 8/24* (2013.01); *G01N 15/0205* (2013.01); *G01N 21/3554* (2013.01); *G01N 21/85* (2013.01); *G05B 13/0265* (2013.01); *G05B 13/042* (2013.01); *G05B 13/048* (2013.01); *B01J 2208/00672* (2013.01); *B01J 2208/00699* (2013.01); *B01J 2208/00725* (2013.01); *B01J 2208/00796* (2013.01); *B01J 2219/00209* (2013.01); *B01J 2219/00211* (2013.01); *G01N 2021/1765* (2013.01); *G01N 2021/8416* (2013.01)

(58) Field of Classification Search
CPC ............... B01J 2208/00725; B01J 2/16; B01J 2219/00209; B01J 2208/00672; B01J 8/082; B01J 2208/00796; G05B 13/042; G05B 13/048; G05B 13/0265
See application file for complete search history.

(56) References Cited

U.S. PATENT DOCUMENTS

| | | | | |
|---|---|---|---|---|
| 9,334,096 | B2* | 5/2016 | Luciano, Jr. | .......... A61J 7/0084 |
| 2003/0068367 | A1* | 4/2003 | Sowden | .................. A61J 3/005 |
| | | | | 424/464 |
| 2004/0057650 | A1* | 3/2004 | Folestad | ............... G01J 3/0218 |
| | | | | 385/14 |
| 2013/0218529 | A1* | 8/2013 | Vikstrom | ................ G06F 30/00 |
| | | | | 703/1 |
| 2016/0222306 | A1* | 8/2016 | Tsang | ..................... C10K 1/026 |
| 2016/0310365 | A1* | 10/2016 | Boeckx | .................. B29B 7/726 |

OTHER PUBLICATIONS

Search Report for GB1811303.5 by the UK Intellectual Property Office; dated Jan. 21, 2019; 2 pages.
Madarasz, L. et al., Real-Time Feedback Control of Twin-Screw Wet Granulation Based on Image Analysis, International Journal of Pharmaceutics, vol. 547, No. 1-2, Jun. 4, 2018, pp. 360-367.
Nagy, B. et al., In-Line Raman Spectroscopic Monitoring and Feedback Control of a Continuous Twin-Screw Pharmaceutical Powder Blending and Tableting Process, International Journal of Pharmaceutics, vol. 530, Jul. 16, 2017, pp. 21-29.
Vargas, J. et al., Process Analytical Technology in Continuous Manufacturing of a Commercial Pharmaceutical Product, International Journal of Pharmaceutics, vol. 538, Jan. 30, 2018, pp. 167-178.
Csontos, I. et al., Feedback Control of Oximation Reaction by Inline Raman Spectroscopy, Organic Process Research & Development, vol. 19, 2015, pp. 189-195.

* cited by examiner

APPARATUS AND METHOD FOR THE PRODUCTION OF SOLID DOSAGE FORMS

CROSS REFERENCE TO RELATED APPLICATIONS

This application claims priority to United Kingdom Patent Application No. GB 1811303.5 filed Jul. 10, 2018, the entire contents of which are incorporated herein by reference.

FEDERALLY SPONSORED RESEARCH AND DEVELOPMENT

None.

BACKGROUND OF THE INVENTION

1. Field of the Invention

This invention relates to an apparatus for the production of solid dosage forms such as granulates and pellet materials. In particular, the present invention is directed towards intelligence and control technology for use with fluid bed systems and other material processing apparatus such as multiple unit operations suitable for batch process or as a unifying platform across a continuous process. Fluid bed systems are utilized in the process and manufacture of solid dosage forms such as granulates as well as pelleted and powdered products.

2. Background

In the manufacture of solid dose forms, certain end-product characteristics, such as dissolution, require quality control (QC) testing to determine optimal quality. Dissolution, however, cannot be directly measured in-line due to the long duration of the analytical test. It can, therefore, take several days or weeks until, for example, dissolution test results are available which causes delays in process development and adds considerable time to commercial manufacture cycle time unless it is decided to proceed at risk with these activities.

There is also an increased need for data retrieval and demonstrated understanding across the whole product research and development process to meet increased regulatory demands, with the degree of available scientific knowledge impacting on the degree of regulatory flexibility.

Current solutions are flawed in that a great deal of human intervention is still required and as such this leads to inconsistent data or introduction of human error into data sets meaning that the data produced is unreliable. Such need for human intervention in product development and production processes along with the increased need for large scale data collection and record keeping for regulatory and auditing purposes means that current solutions will only become more expensive to run with such costs being unsustainable.

It is an object of the present invention to provide a method and/or apparatus that overcomes at least some of the above mentioned problems.

Pharmaceutical manufacturing processes are described in: Int. J. Pharmaceutics 547 (2018) 360-367 Madarasz, L et al; Int. J. Pharmaceutics 530 (2017) 21-29, Nagy B, et al; Int. J. Pharmaceutics 538 (2018) 167-178 Vargas JM et al; and, Organic Process R&D (2014) Spec Ed. PAT 14 Csontos I et al.

SUMMARY OF THE INVENTION

According to the invention, there is provided apparatus for the production of solid dosage forms, comprising: a material processing chamber which is operable for manufacturing a product according to a pre-set product formation process path; at least one sensor for continuously monitoring formation of the product in the material processing chamber during the product formation process non-invasively in real time by sensing at least one product functional attribute value; means for comparing each sensed product functional attribute value with a desirable product functional attribute value for that point on the product formation process path; and a controller for controlling operation of the material processing chamber in response to the sensed product functional attribute value for maintaining the product on the product formation process path.

In one embodiment of the invention two on-line sensors are provided, namely a first sensor and a second sensor, wherein the first sensor senses a first desirable product functional attribute value and the second sensor senses a second desirable product functional attribute value, the second desirable product functional attribute value being different to the first.

In another embodiment of the invention, the apparatus comprises a material processing chamber with a raw material inlet and an end product outlet, means to measure system operational variables of the material processing chamber and at least one sensor, wherein the at least one sensor is capable of real-time measurement of a functional attribute of the material being processed within the material processing chamber, a PAT analyzer suite and a data control unit, wherein the data control unit is in communication with the PAT analyzer suite, a processor, wherein the processor is in communication with the data control unit, a data historian, a user interface, wherein the user interface is independently in communication with the processor, the data control unit and the data historian, a data analytics unit, wherein the data analytics unit is capable of processing real-time data on the functional attributes of the material being processed to provide a predictive model of the resulting end-product attributes, the apparatus being configured to enable in-line adaptation of the system variables of the material processing chamber in response to the predictive model of the end-product attributes modelled from the process material functional attributes measured by the at least one sensor, such that adaptation of the material processing chamber system variables results in optimal process material functional attributes.

One advantage of the apparatus of the invention is that it is adaptable to the needs of both small scale production suitable for research and process development and capable of use in large scale commercial manufacture.

Another advantage is that the present apparatus accelerates the process development procedure.

Another advantage is that consistent, reliable, regulatory compliant and reproducible data is made possible.

A further advantage of the present apparatus is that it saves time, removes wastage throughout the development and production process by automating, reducing or eliminating unnecessary or time consuming tasks.

Another advantage is that human resources are freed up for more value added tasks which can only be done by a human being, and resulting in reduced costs of product development and production.

In a further embodiment the at least one sensor is mounted to the material processing chamber.

In a preferred embodiment the at least one sensor is mounted to an external portion of the material processing chamber, such that, in use, the at least one sensor does not come into contact with any process material within the material processing chamber. An advantage of positioning the sensor externally is that it does not interfere or influence the internal state conditions of the material processing chamber.

In a further embodiment the at least one sensor is an imaging device.

In a further embodiment the at least one sensor is capable of measuring reflectance signals.

In a further embodiment the apparatus comprises a process visualization interface.

In a further embodiment the apparatus comprises a display.

In a preferred embodiment the display is formed of a plurality of different panes. The advantage of the panes is that a multitude of various data can be displayed simultaneously without the need for moving between different programs, functions, views or screens.

In a further embodiment the apparatus comprises artificial intelligence capable of machine learning.

In a further embodiment the apparatus is at least partially autonomous. An advantage of partial autonomy is that the system can take over human input under certain conditions. A further advantage of partial autonomy is decreased need for human operator interference and potential for the introduction of errors. Another advantage of partial autonomy is that it provides a safety net from things getting missed due to, for example, a sample not been taken and analyzed on time or corrective measures taken to maintain the quality of the product being produced.

In a further embodiment the apparatus is fully autonomous such that it is capable of self-guiding. An advantage of full autonomy is that the system can adjust system variables without human intervention or supervision. In addition, the introduction of human error can be avoided.

Another advantage of full autonomy is that zero sampling is required. This is particularly advantageous when working with highly potent compounds and materials.

In a further embodiment the apparatus is automated.

In a further embodiment the data analytics unit is operable to use aggregated data on the functional attributes of the process material to form the predictive model.

In a further embodiment the PAT analyzer suite is configured and controlled by the data control unit.

In a further embodiment the data on the functional attributes of the process material relates to physiochemical properties of the process material.

In a preferred embodiment the functional attributes of the process material are selected from one or more of particle size, particle distribution, granulate size, granulate distribution, moisture content, moisture distribution pattern, shape, bead thickness, dissolution rate.

In a further embodiment the end-product attributes are selected from one or more of dissolution rate, solubility, stability, form definition, solid-state properties, hardness, friability, assay content uniformity, disintegration, compressibility, degradation, flowability, compactability and ionization.

In a further embodiment the predictive model is presented on a display of the user interface.

In a further embodiment the apparatus comprises an input means on the user interface that enables a user to input a command such that the command changes the system operational variables of the material processing chamber to effect a change in the functional attributes of the process material within the material processing chamber.

In a further embodiment the data historian is cloud-based.

In a most preferred embodiment the apparatus comprises a fluid bed system, wherein the fluid bed system comprises a material processing chamber having a raw material inlet and an end product outlet.

In another aspect the invention provides a method for manufacturing a solid dosage form product comprising: operating a material processing chamber for manufacturing the product according to a preset product formation process path; continuously monitoring formation of the product in the material processing chamber during the product formation process non-invasively in real time by sensing at least one product functional attribute value; comparing each sensed product functional attribute value with a desirable product functional attribute value for that point on the product formation process path; and controlling operation of the material processing chamber in response to the sensed product functional attribute value for maintaining the product on the product formation process path.

In another embodiment, the method comprises the steps of first running schedules of experiments for process development to characterize the design space and saving the schedules of experiments for process development on the user interface for later use, creating a DoE on the user interface, measuring the functional attributes of the process material using the at least one sensor, analyzing the sensor data using the PAT analyzer suite to result in PAT data, which is then transmitted to the data control unit, the data control unit transforming the PAT data into a processor readable format and transmits the resulting processor readable format of the PAT data to the processor, utilizing the processor readable format of the PAT data to make logic decisions using the processor, selecting a command to be made to the material processing chamber, which is transmitted to the data control unit, transforming the command into a material processing chamber readable command format; and transmitting the material processing chamber readable command format to the material processing chamber.

In a further embodiment the method effects a change in the system variables of the material processing chamber in response to the material processing chamber receiving a material processing chamber readable command format. The change in system variables of the material processing chamber effects a change in the functional attributes of the process material within the material processing chamber of the apparatus.

In a further embodiment the method comprises the data control unit transforming the PAT data into a data historian readable PAT format. The data historian readable PAT format may be transmitted to the data historian, the data historian readable PAT format being readable by the analytic unit located on the data historian. The analytic unit of the data historian analyses the data historian readable PAT format to produce a predictive model of the end-product attributes that would result from the DoE and system variables of the material processing chamber. The predictive model is then transmitted to the data control unit; the data control unit then transforms the predictive model into a processor readable model format.

In a further embodiment the method comprises the steps of displaying the predictive model of on the display of the user interface.

In a further embodiment the processor readable model format is utilized to make the logic decisions.

In a further embodiment the method comprises storing any one of the data types generated at various steps within the process in the data historian.

In a most preferred embodiment the apparatus with which the method is used is a fluid bed system.

Process Analytical Technology or "PAT" allows process measurements to be taken and can aid more efficient product development and manufacture. Functional attributes may broadly be divided into quality attributes, material attributes and process attributes and there is value in monitoring these attributes throughout the development and production processes of solid dosage forms.

Monitoring said functional attributes of a material undergoing processing, such as particle size distribution, granulate size, shape and moisture content, or the process itself, such as inlet air humidity, can help ensure the quality is controlled and maintained throughout the process development and production. The ability to monitor particle growth in real-time allows a deeper understanding of the process and aids in the development of an improved process control strategy. Such monitoring and control of the material being processed supports a better quality end-product as a result.

Understanding the functional attributes of a material and how these functional attributes change during processing can be achieved by gathering PAT data. Such PAT data enables critical and interacting variables to be identified and a design space can be devised within which optimal end-product attributes can be achieved. Operating within this design space therefore helps to maintain the quality of the end-product.

First formal schedules of experiments for process development are run in order to characterize the design space, identifying those critical quality attributes (CQAs) and interacting variables which ultimately influence the quality of the end-product. Through this process key attributes which may be changed in order to influence the end-product achieved are identified. Using this collated data a Design of Experiment (DoE) can be created that falls within the predefined design space. Collating such data is useful to demonstrate extensive knowledge of your development and production process and of the product performance, derived from said process, across a wide range of attributes.

Deviations from the design space can impact on the final end-product attributes, particularly where they move outside the acceptable range, which has been set. Traditionally, sampling of the material being processed has been necessary to determine the functional attributes offline and, where necessary, to then adjust the system parameters manually.

Automated sampling enables a swifter turnaround of measurements enabling these to be performed on-line in some cases; however, existing material processing apparatus' are simply not capable of enabling real-time adjustment of system variables in response to such measurements taken, in order to effect a real-time change in the functional parameters of the solid dosage forms undergoing processing and still require human user input to manually adjust the system variables. As such real-time sampling or taking of measurements does not equate to real-time changes made to the functional attributes of the solid dosage forms undergoing processing.

None of the prior art teaches a partial autonomous material processing apparatus capable of taking process control in certain situations, let alone a fully autonomous apparatus capable of self-guiding. Off-line sampling for QC testing is still necessary with existing process apparatus and the user is still required to manually adjust the system variables of the apparatus to effect a change in the functional attributes of the intermediary material to influence the resulting end-product.

BRIEF DESCRIPTION OF THE DRAWINGS

The invention will be more clearly understood from the following description of some embodiments thereof, given by way of example only, with reference to the accompanying drawings.

DETAILED DESCRIPTION OF THE INVENTION

Figure 1:
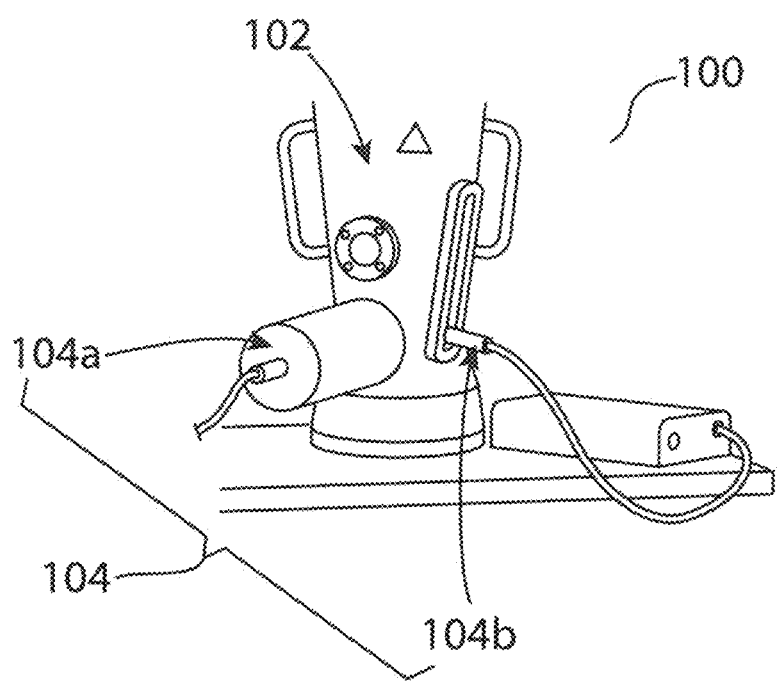
FIG. 1 is a perspective view of a fluid bed system according to the invention with a direct-imaging particle analyzer attached.

Referring to FIG. 1, there is shown a portion of apparatus of the present invention indicated generally by reference numeral 100. The apparatus 100 comprises a fluid bed system 102 and two on-line sensors 104, wherein the sensors are mounted at a side wall of the fluid bed system 102. Furthermore, FIG. 1 shows a sensor combination of a direct imaging particle analyzer 104a and a multipoint Near-Infrared (NIR) spectrometer 104b.

The direct imaging particle analyzer 104a, generates real-time on-screen images pertaining to particle size and shape of material being processed within a material processing chamber of the fluid bed system 102, while the multi-point Near-Infrared (NIR) spectrometer 104b, enables moisture measurement of product within the material processing chamber of the fluid bed system 102.

The sensors 104 measure product functional attribute values during formation of the product in the material processing chamber of the fluid bed system 102. These sensed functional attribute values are compared with desired product functional attribute values for the product at that stage of the product formation. Operation of the fluid bed system 102 is adjusted if necessary to maintain the product being formed on a desired product formation process path as it is being formed.

Figure 2:
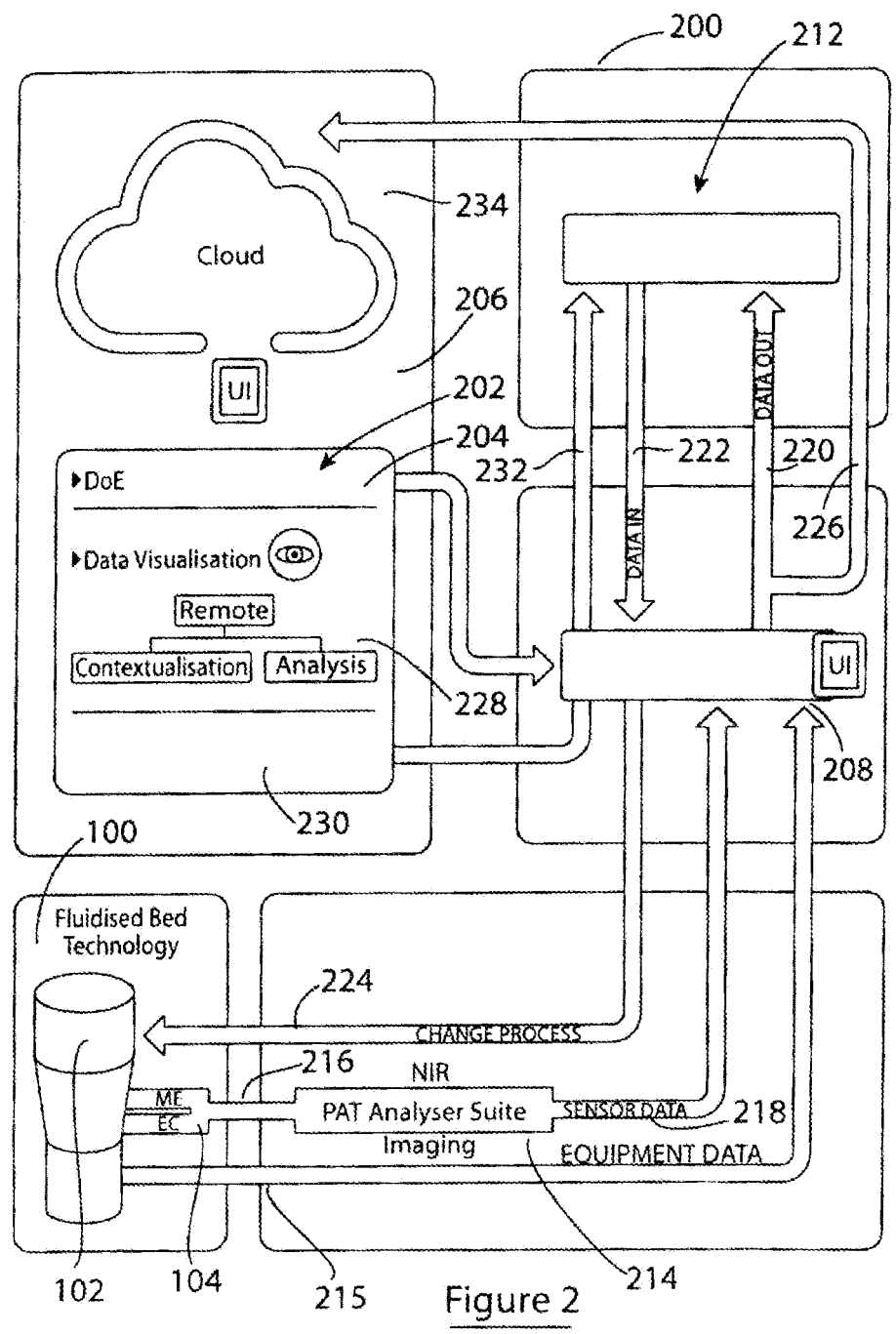
FIG. 2 is a diagrammatic process flow for the system of the present invention.

Referring now to FIG. 2, there is provided a schematic overview of the apparatus of the present invention indicated generally by reference numeral 200. Schedules of experiments for process development and/or Design of Experiments (DoEs) 202 are shown on a user interface 204 of a data historian 206. The data historian 206 is in communication with a data control unit 208. The data control unit 208 is also shown to be in communication with the fluid bed system 102, a processor 212 and a PAT analyzer suite 214. The data control unit 208 controls the flow of information and data between the data historian 206, the processor 212, the fluid bed system 102 and the PAT analyzer suite 214 and enables communication between the different components of the apparatus by transforming information received into a format that is readable by the data historian 206, the processor 212, the fluid bed system 102 and the PAT analyzer suite 214.

In use, a user runs a schedule of experiments for process development. This enables the user to determine the design space. The schedules of experiments for process development that have been run may be stored in the data historian 206 for later use. The user then creates a Design of Experiment (DoE) 202 using the user interface 204. The DoE 202 may then be stored in the data historian 206 for later use. A stored DoE 202 is selected via the user interface 204 and the DoE information is transmitted to the data control unit 208. The data control unit 208 transforms the DoE information into a fluid bed system readable DoE format and transmits the fluid bed system readable DoE format to the fluid bed system 102, wherein the fluid bed system readable DoE format runs a DoE schedule 202. Raw material enters a material processing chamber of the fluid bed system 102 and the raw material is processed in the material processing chamber of the fluid bed system 102 in accordance with the system operational variables of the fluid bed system 102. It is to be appreciated that the system operational variables may be set by the DoE schedule 202 run.

The material processing chamber of the fluid bed system 102 is monitored by measuring internal state conditions using at least one sensor 104 resulting in sensor data 216. Internal state conditions may comprise functional attributes of the process material in the material processing chamber of the fluid bed system 102, such as particle size, particle distribution or moisture content.

In addition measurements of system variables of the fluid bed system 102, such as temperature and flow rate, are transmitted 215 to the data control unit 208.

The sensor data 216 is then analyzed using the PAT analyzer suite 214 to result in PAT data 218, which is then transmitted to the data control unit 208. The data control unit 208 transforms the PAT data 218 into a processor readable PAT format 220 and transmits the processor readable PAT format 220 to the processor 212. The processor 212 uses the processor readable PAT format 220 providing information on the internal state conditions of the fluid bed system 102 to make logic decisions that result in a command 222 to be made to the fluid bed system 102. The command 222 is then transmitted to the data control unit 208, the data control unit 208 transforms the command into fluid bed readable command format 224 and transmits the fluid bed readable command format 224 to the fluid bed system 102 to effect a change in the fluid bed system 102 system variables.

It is to be appreciated that while the command is described as effecting a change, such a command may result in the system variables being maintained, such that no change is made.

PAT data transmitted to the data control unit 208 may also be transformed into a data historian readable PAT format 226, the data historian readable PAT format 226 may then be displayed on the user interface 204 of the data historian 206. The data historian readable PAT format 226 may be processed by an analytic unit 228 to produce a predictive model 230 of end-product attributes as a result of the DoE schedule 202 and internal state conditions of the fluid bed system 102. The predictive model 230 may be displayed on the user interface 204 of the data historian 206. In addition, direction on what action to take may also be displayed.

It is to be appreciated that the predictive model 230 may comprise of data on internal state conditions of the fluid bed system 102 from the current DoE schedule 202 or include data on internal state conditions of the fluid bed from previously run DoE schedules 202. This data on internal state conditions of the fluid bed system 102 may be aggregated and presented together in the predictive model 230.

The predictive model 230 is transmitted to the data control unit 208; the data control unit 208 transforms the predictive model 230 into a processor readable model format 232. The processor 212 uses the processor readable model format 232 to make logic decisions that result in a command 222 to be made to the fluid bed system 102. The command 222 is then transmitted to the data control unit 208, the data control unit 208 transforms the command 222 into fluid bed readable command format 224 and transmits the fluid bed readable command format 224 to the fluid bed system 102 to effect a change in the fluid bed system 102 system variables.

It is to be appreciated that while the command is described as effecting a change, such a command may result in the system variables being maintained, such that no change is made.

The user may, optionally, initiate a command 222 by selecting an action via an input means (not shown) located on the user interface 204 of the data historian 206 in response to the predictive model 230 displayed on the user interface 204 of the data historian 230. This action is transmitted to the data control unit 208, the data control unit 208 then transforms the action into processor readable action format 232; the processor 212 uses the processor readable action format 232 to make logic decisions that result in a command 222 to be made to the fluid bed system 102. The command 222 is then transmitted to the data control unit 208, the data control unit 208 transforms the command 222 into fluid bed readable command format 224 and transmits the fluid bed readable command format 224 to the fluid bed system 102 to effect a change in the fluid bed system 102 system variables.

It is to be appreciated that while the command is described as effecting a change, such a command may result in the operational parameters being maintained, such that no change is made.

It is also to be appreciated that the apparatus may use the predicative model 230 to inform the logic decisions and determine the appropriate command 222 to be selected. As such, the apparatus may comprise artificial intelligence capable of learning and refining the system variables of the fluid bed system 102 based on current and past run DoE schedules 202.

While user input is described, it is to be appreciated that in alternative embodiments of the present invention (not shown) the apparatus may implement corrective measures giving rise to commands to alter or maintain the system variables.

It is to be appreciated that data created and generated through use of the apparatus may be saved and stored on the data historian 206 at any point throughout the process.

One advantage to saving and collating large data sets, such as is capable with the present invention, is that the user can identify and detect invalid or altered records, whether intentional or inadvertent, which is useful in audit trails.

FIG. 2 shows the storage means as cloud-based storage 234 within the data historian 206. It is to be appreciated that while cloud-based storage 234 is shown, other means of data storage may be employed.

Figure 3:
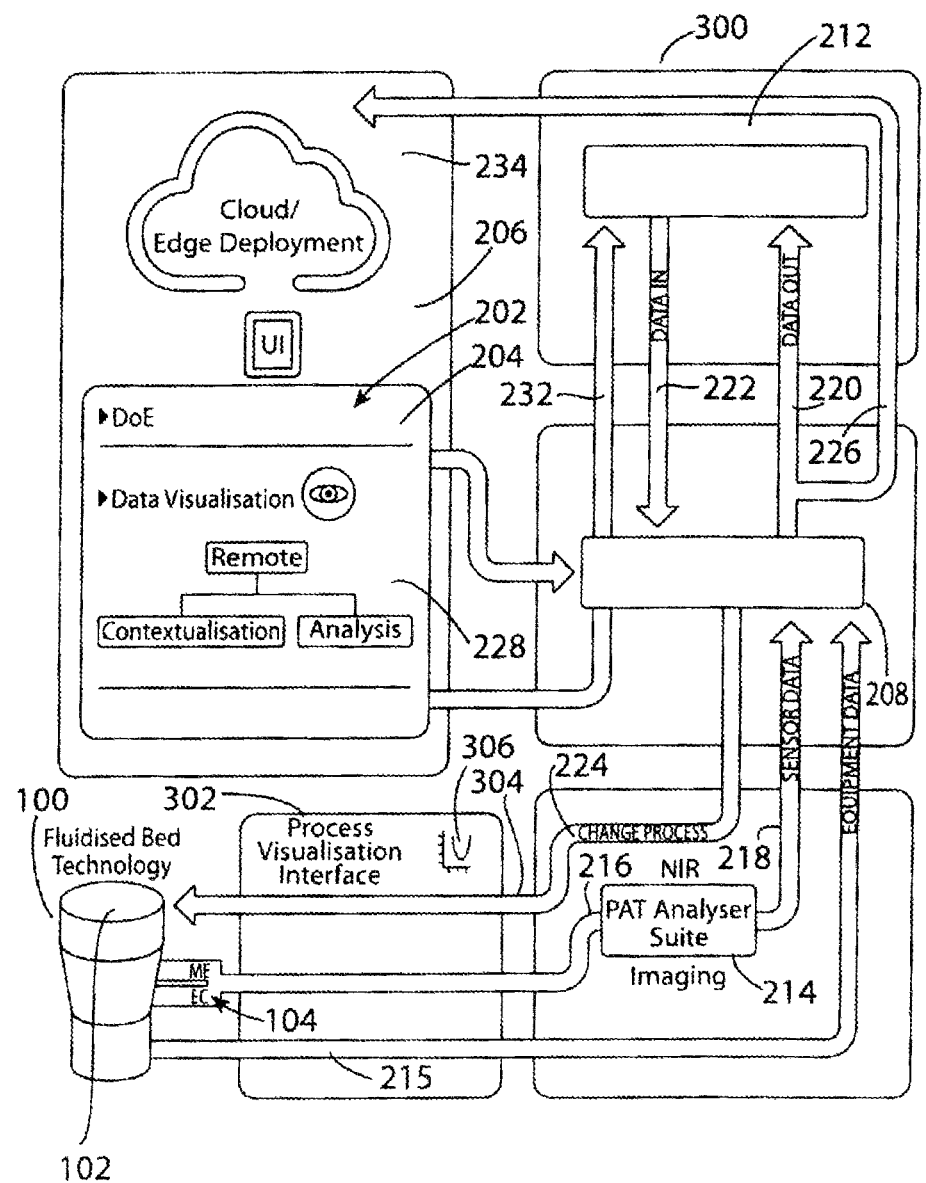
FIG. 3 is a diagrammatic process flow for the system according to another embodiment of the invention.

Referring now to FIG. 3, there is provided an overview of apparatus according to another embodiment of the invention indicated generally by reference numeral 300. Parts similar to those described previously are assigned the same reference numerals. Schedules of experiments for process development and/or Design of Experiments (DoEs) 202 are shown on the user interface 204 of the data historian 206. The data historian 206 is in communication with the data control unit 208. The data control unit 208 is also shown to be in communication with the fluid bed system 102, a process visualization interface 302, the processor 212 and the PAT analyzer suite 214. The data control unit 208 controls the flow of information and data between the data historian 206, the processor 212, the fluid bed system 102, process visualization interface 302 and the PAT analyzer suite 214 and enables communication between the different components of the apparatus by transforming information received into a format that is readable by the data historian 206, the processor 212, the fluid bed system 102, process visualization interface 302 and the PAT analyzer suite 214.

In this embodiment a fluid bed system is shown; however, it is to be appreciated that the control technology of the present invention may also function with other material processing apparatus and multiple unit operation suitable for batch process or as a unifying platform across a continuous process.

In use, a user runs a schedule of experiments for process development 202, enabling the user to determine the design space. The schedules of experiments for process development that have been run may be stored in the data historian 206 for later use. The user then creates a Design of Experiment (DoE) 202 using the user interface 204. The DoE 202 may then be stored in the data historian 206 for later use. In an alternative embodiment the data historian may be located remotely to the rest of the apparatus. A stored DoE 202 is selected via the user interface 204 and the DoE information is transmitted to the data control unit 208. The data control unit 208 transforms the DoE information into a fluid bed system readable DoE format and transmits the fluid bed system readable DoE format to the fluid bed system 102, wherein the fluid bed system readable DoE format runs a DoE schedule 202. Raw material enters the material processing chamber of the fluid bed system 102 and the material is processed in the material processing chamber of the fluid bed system 102 in accordance with the system variables of the fluid bed system 102. It is to be appreciated that the system variables may be set by the DoE schedule 202 run.

The internal state of the fluid bed system 102 is monitored by measuring internal state conditions using at least one sensor 104 resulting in sensor data 216. It is to be appreciated that internal state conditions comprises functional attributes of the process material in the material processing chamber of the fluid bed system 102, such as particle size, particle distribution or moisture content.

Measurements of system variables of the fluid bed system 102, such as temperature and flow rate, are transmitted 215 to the data control unit 208.

The sensor data 216 is then analyzed using the PAT analyzer suite 214 to result in PAT data 218, which is then transmitted to the data control unit 208. The data control unit 208 transforms the PAT data 218 into a processor readable PAT format 220 and transmits the processor readable PAT format 220 to the processor 212. The processor 212 uses the processor readable PAT format 220 providing information on the internal state conditions of the fluid bed system 102.

In this embodiment the processor readable PAT format 220 providing information on the internal state conditions of the fluid bed system 102 is transmitted from the processor 212 to the data control unit 208. The data control unit 208 transforms the processor readable PAT format 220 into a process visualization interface readable format 304. The process visualization interface readable format 304 is then transmitted from the data control unit 208 to the process visualization interface 302; real-time internal state conditions data 306 is then displayed on the process visualization interface 302.

Logic decisions can be made on the basis of the processor readable PAT format 220 providing information on the internal state conditions of the fluid bed system 102, which results in a command 222 to be made to the fluid bed system 102. The command 222 is then transmitted to the data control unit 208, the data control unit 208 transforms the command 222 into a fluid bed readable command format 224 and transmits the fluid bed readable command format 224 to the fluid bed system 102 to effect a change in the fluid bed system 102 system variables.

In this embodiment, once the command 222 is transmitted to the data control unit 208, the data control unit 208 transforms the command 222 into a process visualization interface command format (not shown).

It is to be appreciated that while the command 222 is described as effecting a change, such a command 222 may result in the system variables being maintained, such that no change is made.

PAT data transmitted to the data control unit 208 may also be transformed into a data historian readable PAT format 226, the data historian readable PAT format 226 may then be displayed on the user interface 204 of the data historian 206. Alternatively, the data historian readable PAT format 226 may then be displayed on the process visualization interface 302. The data historian readable PAT format 226 may be processed by an analytic unit 228 to produce a predictive model 230 of end-product attributes as a result of the DoE schedule 202 and internal state conditions of the fluid bed system 102. The predictive model 230 may be displayed on the user interface 204 of the data historian 206. In addition, direction on what action to take may also be displayed either on the user interface 206 or the process visualization interface 302, or a combination thereof.

It is to be appreciated that the predictive model 230 may comprise of data on internal state conditions of the fluid bed system 102 from the current DoE schedule 202 or include data on internal state conditions of the fluid bed from previously run DoE schedules 202. This data on internal state conditions of the fluid bed system 102 may be aggregated and presented together in the predictive model 230.

The predictive model 230 is transmitted to the data control unit 208; the data control unit 208 transforms the predictive model 230 into a processor readable model format 232. The processor 212 uses the processor readable model format 232 to make logic decisions that result in a command 222 to be made to the fluid bed system 102. The command 222 is then transmitted to the data control unit 208, the data control unit 208 transforms the command 222 into fluid bed readable command format 224 and transmits the fluid bed readable command format 224 to the fluid bed system 102 to effect a change in the fluid bed system 102 system variables.

It is to be appreciated that while the command 222 is described as effecting a change, such a command 222 may result in the system variables being maintained, such that no change is made.

The user may, optionally, initiate a command 222 by selecting an action via an input means (not shown) located on the user interface 204 of the data historian 206 in response to the predictive model 230 displayed on the user interface 204 of the data historian 230. This action is transmitted to the data control unit 208, the data control unit 208 then transforms the action into processor readable action format 232; the processor 212 uses the processor readable action format 232 to make logic decisions that result in a command 222 to be made to the fluid bed system 102. The command 222 is then transmitted to the data control unit 208, the data control unit 208 transforms the command 222 into fluid bed readable command format 224 and transmits the fluid bed readable command format 224 to the fluid bed system 102 to effect a change in the fluid bed system 102 system variables.

In this embodiment real-time changes made to the internal state conditions of the fluid bed system 102 may be displayed as updated real-time internal state conditions data 306 on the process visualization interface 302.

It is to be appreciated that while the command is described as effecting a change, such a command may result in the operational parameters being maintained, such that no change is made. It is also to be appreciated that the apparatus may use the predicative model 230 to inform the logic decisions and determine the appropriate command 222 to be selected. As such, the apparatus may comprise artificial intelligence capable of learning and refining the system variables of the fluid bed system 102 based on current and past run DoE schedules 202.

While user input is described, it is to be appreciated that in alternative embodiments of the present invention (not shown) the apparatus may implement corrective measures giving rise to commands to alter or maintain the system variables.

It is to be appreciated that data created and generated through use of the apparatus may be saved and stored on the data historian 206 at any point throughout the process.

FIG. 3 shows the storage means as cloud-based storage 234 within the data historian 206. It is to be appreciated that while cloud-based storage 234 is shown, other means of data storage may be employed.

Figure 4:
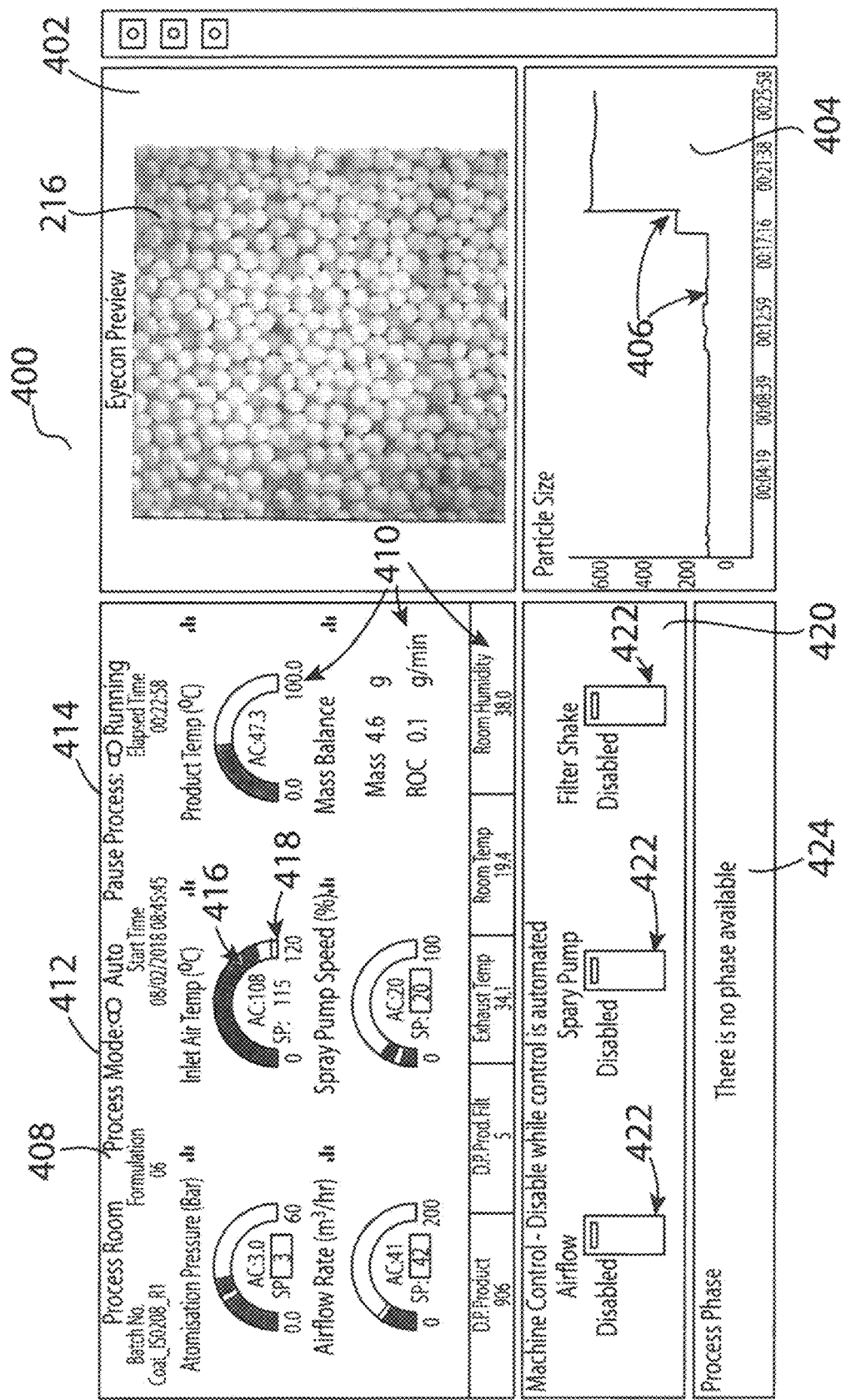
FIG. 4 is a pictorial view of the display function according to a further embodiment of the invention.

Referring now to FIG. 4, there is provided typical display of real-time internal state conditions data 306 as displayed on either of the user interface 204 and/or the process visualization interface 302 and generally referred to by reference 400. The data shown on the display 400 is shown in FIG. 4 to be static. As such it provides a snapshot in time. The display 400 comprises of a number of panes, each pane showing different information. In this embodiment a first pane 402 is showing sensor data 216 in the form of images as taken by one of the sensors 104 connected to the fluid bed system 102. The second pane 404 is displaying sensor data 216 in the form of a graphical representation of particle size data 406 over time as taken by one of the sensors 104 connected to the fluid bed system 102 and analyzed by the PAT analyzer suite 214.

It is to be appreciated that in one embodiment (not shown) the particle size data 406 updates as time elapses meaning that the graphical representation is dynamic. As such the graph is continually moving and changing.

A third pane 408 displays real-time system variables data 410 as well as process mode 412 and status 414. It is to be appreciated that in one embodiment (not shown) the data displayed is dynamic and subject to change depending on the real-time changes in the real-time internal state conditions of the fluid bed system 102. Each real-time system variable data 410 is shown as having a pre-determined acceptable range 416 within which sets the boundaries of acceptable variation in the systems variables and a counter 418 which indicates the current reading for each real-time system variable data 410.

In use, as the systems variables data 410 changes the counter 418 moves to indicate the real-time current reading. Where the counter 418 falls outside the pre-determined acceptable range 416, corrective measures may be taken to alter the current reading, as indicated by the counter 418 so that it falls within the pre-determined acceptable range 416.

It is to be appreciated that certain real-time system variable data 410 may not comprise the pre-determined acceptable range 416 and the counter 418.

It is to be appreciated that the pre-determined acceptable range 416 is determined following a series of schedule of experiment for process development which sets the design space and which variables are the critical quality attributes in the product development and production process.

A fourth pane 420 shows machine control switches 422, which can be manipulated to effect a change in certain functions as may be required during the process development and production process. In this embodiment these switches 422 are disabled in the automated process mode 412 meaning that they may not be manually operated. While the switches 422 are shown as disabled in automated process mode 412, it is to be appreciated that in manual process mode 412 the switches 422 will be enabled, meaning that they may be manually switched on or off at the desired time.

An advantage to locking such switches 422 is that these are not accidentally turned on or off during the process development or production run.

A fifth pane 424 shows details pertaining to the process phase. In this embodiment, this pane is blank as no process phase information is available for display.

While certain types of data is shown as displayed in FIG. 4, it is to be appreciated that other types of data may also be displayed in addition to or in place of the data shown in FIG. 4. The type of data shown on the display 400 depends on the attributes of interest and in particular on the critical quality attributes which will change depending on the product to be made.

While the display 400 is shown to have a set number of panes in FIG. 4, it is appreciated that the number of panes may vary depending on the type of information and the amount of detail required to be displayed.

While the display 400 is described in context of a fluid bed system it is to be appreciated that the display 400 of the control technology of the present invention could also be used with other material process apparatus.

The term "Functional Attribute" includes dynamic and non-dynamic characteristics of end-products, intermediate materials and raw materials.

The term "Raw Material Attributes" includes, but is not limited to, granulate size, particle size, particle shape, moisture content, bead thickness, dissolution and any other attribute associated with raw material quality and functionality.

The term "Intermediate Material Attributes" includes, but is not limited to, granulate size, particle size, particle shape, moisture content, bead thickness, dissolution and any other attribute associated with intermediate material quality and functionality.

The term "End-Product attribute" includes, but is not limited to, hardness, friability, assay content uniformity, weight uniformity, dissolution rate, disintegration and any other physical or behavioral characteristics associated with end-product quality and functionality.

The term "System Variables" includes, but is not limited to, excipient levels, compression force, disintegrant level, binder level, lubricant level, temperature, humidity, atmospheric pressure, atomization pressure, spray rate, airflow rate and any other variables of the apparatus that make up the essential properties of the apparatus conditions to which the material being processed is exposed. As such the any one or more of the System Variables may impact on the Functional Attributes of any one or more of the end-products, intermediate materials and raw materials which are subject to the internal state conditions of the apparatus. Such System Variables may be modified to achieve different Functional Attributes to result.

The terms "process material", "material being processed" and "solid dosage forms undergoing processing" and any variations thereof required for grammatical reasons are to be considered as interchangeable and accorded the widest possible interpretation. It will be understood that this may include raw materials, intermediates and end products undergoing processing and/or that are subject to the internal state conditions of the material processing chamber.

The term "Internal state conditions" includes one or more of system variables, raw material attributes, intermediate attributes and end-product attributes.

The term "Solid Dosage Forms" includes, but is not limited to, pills, tablets, capsules, granules, sachets, reconstructable powders, powders, dry powders, chewables and any other solid dosage form suitable for use as or in pharmaceutical, biopharmaceutical, veterinary, nutraceutical, cosmetic, argrochemical, fine chemical, speciality chemical or commodity chemical preparations. Solid Dosage Forms may comprise of any one or more of the end-products, intermediate materials and raw materials.

The terms "Fluid Bed" and "Fluidized Bed" and any variations thereof required for grammatical reasons are to be considered as interchangeable and accorded the widest possible interpretation. It will be understood that Fluid Bed systems include those suitable for the processing powders, pellets, and granulates and any other materials suitable for use in a Fluid Bed system.

The term "autonomous" will be understood to include material processing apparatus that is capable of taking over management of the material processing apparatus under certain conditions. For example, where the functional attributes have veered outside of the acceptable range and no corrective instruction has been provided. The system may apply its own corrective measures based on predictive modelling.

The term "self-guided" will be understood to include an apparatus or system capable of undertaking adjustments to the system variables, as may be necessary to influence the functional attributes of the solid dosage forms undergoing processing, without the supervision of a guide, user or operator.

The terms "comprise" and "include", and any variations thereof required for grammatical reasons, are to be considered as interchangeable and accorded the widest possible interpretation.

It will be understood that the components shown in any of the drawings are not necessarily drawn to scale, and like parts shown in several drawings are designated the same reference numerals.

It will be further understood that features from any of the embodiments may be combined with alternative described embodiments, even if such a combination is not explicitly recited hereinbefore but would be understood to be technically feasible by the person skilled in the art.

The invention is not limited to the embodiments hereinbefore described which may be varied in both construction and detail within the scope of the appended claims.

What is claimed is:

1. Apparatus for the production of solid dosage forms, comprising:
    a fluid bed system having a material processing chamber which is operable for manufacturing a product according to a pre-set product formation process path;
    at least two on-line sensors mounted at a side wall of the material processing chamber for continuously monitoring formation of the product in the material processing chamber during the product formation process non-invasively in real time by sensing at least one product functional attribute value;
    the sensors being mounted at a side wall of the material processing chamber, such that, in use, each sensor does not come into contact with any process material within the material processing chamber,
    the sensors comprising a direct imaging particle analyzer operable to generate real-time on-screen images pertaining to particle size and shape of material being processed within the material processing chamber, and a multipoint near-infrared spectrometer which enables moisture measurement of product within the material processing chamber;
    means for comparing each sensed product functional attribute value with a desirable product functional attribute value for that point on the product formation process path; and
    a processor for controlling operation of the material processing chamber in response to the sensed product functional attribute value for maintaining the product on the product formation process path.

2. Apparatus as claimed in claim 1, including:
    means to measure system variables of the material processing chamber;
    a PAT analyzer suite;
    a data control unit, wherein the data control unit is in communication with the PAT analyzer suite;
    a processor, wherein the processor is in communication with the data control unit;
    a data historian;
    a user interface, wherein the user interface is independently in communication with the processor, the data control unit and the data historian; and
    a data analytics unit, wherein the data analytics unit is capable of processing real-time data on the functional attributes of the material being processed to provide a predictive model of the resulting end-product attributes;
    wherein the apparatus is configured to enable in-line adaptation of the system variables of the material processing chamber in response to the predictive model of the end-product functional attributes modelled from the process material functional attributes measured by the at least one sensor, such that adaptation of material processing chamber system variables results in optimal process material functional attributes.

3. Apparatus as claimed in claim 1, wherein the apparatus comprises a process visualization interface.

4. Apparatus as claimed in claim 1, wherein the apparatus comprises artificial intelligence capable of machine learning.

5. Apparatus as claimed in claim 1, wherein the apparatus is at least partially autonomous.

6. Apparatus as claimed in claim 5, wherein the apparatus is fully autonomous, such that it is capable of self-guiding.

7. Apparatus as claimed in claim 2, wherein the data analytics unit is operable to use aggregated data on the functional attributes of the process material to form the predictive model.

8. Apparatus as claimed in claim 2, wherein the data on the functional attributes of the process material relates to physiochemical properties of the process material.

9. Apparatus as claimed in claim 2, wherein the functional attributes of the process material are selected from one or more of particle size, particle distribution, granulate size, granulate distribution, moisture content, moisture distribution pattern, shape, bead thickness and dissolution rate.

10. Apparatus as claimed in claim 2, wherein the end-product attributes are selected from one or more of dissolution rate, solubility, stability, form definition, solid-state properties, hardness, friability, assay content uniformity, disintegration, compressability, degradation, flowability, compactability and ionization.

* * * * *